United States Patent [19]
Wallace et al.

[11] Patent Number: 5,238,207
[45] Date of Patent: Aug. 24, 1993

[54] AIRCRAFT RUDDER BOOST SYSTEM

[75] Inventors: Frederick R. Wallace; Joseph N. Hein, both of Wichita, Kans.

[73] Assignee: Learjet Inc., Wichita, Kans.

[21] Appl. No.: 685,853

[22] Filed: Apr. 16, 1991

[51] Int. Cl.⁵ .............................. B64C 13/36
[52] U.S. Cl. ............................................ 244/78
[58] Field of Search ............... 244/234–237, 244/75 R, 78, 177, 226, 227; 60/565, 566, 390, 401

[56] References Cited

U.S. PATENT DOCUMENTS

| | | | |
|---|---|---|---|
| 2,451,263 | 10/1948 | Webb | 244/236 |
| 2,590,029 | 3/1952 | Minorsky | 244/236 |
| 2,620,772 | 12/1952 | McLane | 244/226 |
| 2,686,896 | 8/1954 | Mathews | 244/236 |
| 2,865,337 | 12/1958 | Dennis et al. | 244/236 |
| 2,870,745 | 1/1959 | Kenyon et al. | 244/226 |
| 2,991,028 | 7/1961 | Sedgfield et al. | 244/227 |
| 3,578,270 | 5/1971 | Ellis | 244/236 |
| 4,470,570 | 9/1984 | Sakurai et al. | 244/236 |

FOREIGN PATENT DOCUMENTS 1104903  11/1955  France .................. 244/226

Primary Examiner—Galen Barefoot
Attorney, Agent, or Firm—Edward L. Brown, Jr.

[57] ABSTRACT

The invention is a proportional rudder boost system for manually controlled aircraft which also have a yaw dampening system. The boost system includes four sensors in the pilot's and copilot's pedals including a summation means which adds the manual inputs from both pilots to provide a combined output signal to the power boost computer. Once the combined output signal exceeds a minimum force level, the boost computer signals the yaw servo to increase its torque applied to the rudder from zero in proportion to the increase in manual force applied to the rudder pedals up to a maximum power assist force level.

7 Claims, 1 Drawing Sheet

AIRCRAFT RUDDER BOOST SYSTEM

BACKGROUND OF THE INVENTION

The invention relates generally to controlling the yaw attitude of an aircraft and more particularly to a rudder boost system for a manually controlled aircraft which provides to the pilot a variable power assist on the rudder pedals which is proportional to the force level which the pilot is manually applying to the controls. Under most conditions of flight, rudder control forces are required for various flying operations, such as take-off climb, coordinated turn crosswind landings and taxing of the aircraft once on the ground. With a manually controlled aircraft, many of these rudder use conditions require minimal rudder pedal forces which the pilot can easily handle. However, under certain situations such as engine failure on take-off, a substantial rudder force is required, due to asymmetrical engine thrust, to maintain the aircraft on a correct flight path without side-slip and roll. A rudder boost system provides additional rudder pedal force to augment the pilot's manual control of the rudders. The rudder boost system of the present invention engages only after the manual force applied to the rudders has exceeded a certain level and the flaps of the aircraft are partially extended. As additional manual force is applied to the rudder pedals, the amount of power boost is proportionally increased from zero to a maximum boost level.

DESCRIPTION OF THE PRIOR ART

Power assist for moving aircraft controls has long been in existence since the size and speed of aircraft has increased to the point where flight control surfaces have required forces which exceed the manual capacity of the pilot. Almost all large aircraft of today no longer manually drive their flight control surfaces but rather totally drive them electrically or hydroelectrically, such as shown in the patent of Carl U.S. Pat. No. 4,759,515. Systems of this type have become very complex with substantial redundancy requirements.

Manually controlled smaller aircraft of today's designs have various non-manual power systems, such as autopilots and yaw dampening systems which operate the various control surfaces to comply with either autopilot or yaw damper commands. In all of these applications the automatic forces applied to the controls are sufficiently low and can be physically overridden by the pilot in a malfunction or emergency condition.

The most critical need for a rudder boost system takes place on take-off when there is an engine failure and an asymmetrical thrust condition arises wherein the rudder is required to offset the thrust moment caused by the operating engines. The offsetting rudder force required to prevent the plane from rolling over in some situations can exceed 180 pounds of force on the rudder pedals.

A rudder boost system presently on the market senses the failed engine and automatically applies a constant force to the opposite rudder to counteract the moment imbalance on the aircraft. The application of this rudder force, which is substantial, is automatically applied regardless of the manual force which is being applied by the pilots. This type of rudder boost system, which is automatically applied with a substantial force in the vicinity of 60 pounds, can be quite destabilizing to flight and the pilots who are in an emergency situation.

SUMMARY OF THE INVENTION

The rudder boost system of the present invention is only activated under certain conditions and the boost force is proportional to the amount of rudder force being applied by the pilots at that moment. Engagement of the rudder boost can only occur when the flaps of the aircraft are partially extended for take-off, to a level greater than three degrees (3°) and the manual force being applied to the rudders has exceeded a minimum level of 50 pounds or some other preset level. As the force level on the rudder pedals is manually increased by the pilot from that preset level, the amount of boost force or torque from the yaw servo is increased, for example, from zero to 30 foot pounds. While the boost system utilizes the same servo of the yaw dampening system, it is capable of operating independently of the yaw dampening system. The boost system has independent components, such as power sources and computers, with the only shared component with the yaw dampening system being the servo. Simultaneous operation of the rudder boost and the yaw damper is prevented by electronic interlock with the rudder boost taking priority.

It is therefore the principal object of the present invention to provide a rudder boost system on a manually controlled aircraft which engages only after a preset threshold level of force on the rudder pedals is exceeded and the boost force is proportionally variable, and controlled by the pilot.

Another object of the present invention is to provide a rudder boost system for manually controlled aircraft which utilizes the same servo as the yaw dampening system while the boost system remains fully independent of the yaw damper.

Another object of the invention is a rudder boost system which is variable and proportional to the manual forces applied to the rudder.

A further object of the present invention is the provision of a rudder boost system which when engaged minimizes the degree of disturbance to the pilots and the flight of the aircraft.

The foregoing and other objects and advantages of the invention will appear more fully hereinafter from the detailed description which follows, taken together with the accompanying drawings wherein one embodiment of the invention is illustrated by way of example. It is to be understood, however, that the drawings are for illustration purposes only and are not to be construed as defining the limits of the invention.

DESCRIPTION OF THE DRAWINGS

FIG. 1 is a graphical representation of the rudder boost torque applied versus pedal force on the rudders.

DESCRIPTION OF THE INVENTION

Aircraft that are normally manually controlled experience high rudder force requirements only in strong cross-wind landings and, most importantly, in engine failure conditions on take-off. In almost all jet aircraft today engines are offset from the center of the aircraft and therefore when engine failure occurs, the asymmetrical thrust of the good engine must immediately be counteracted to prevent loss of control of the aircraft.

Figure 1:
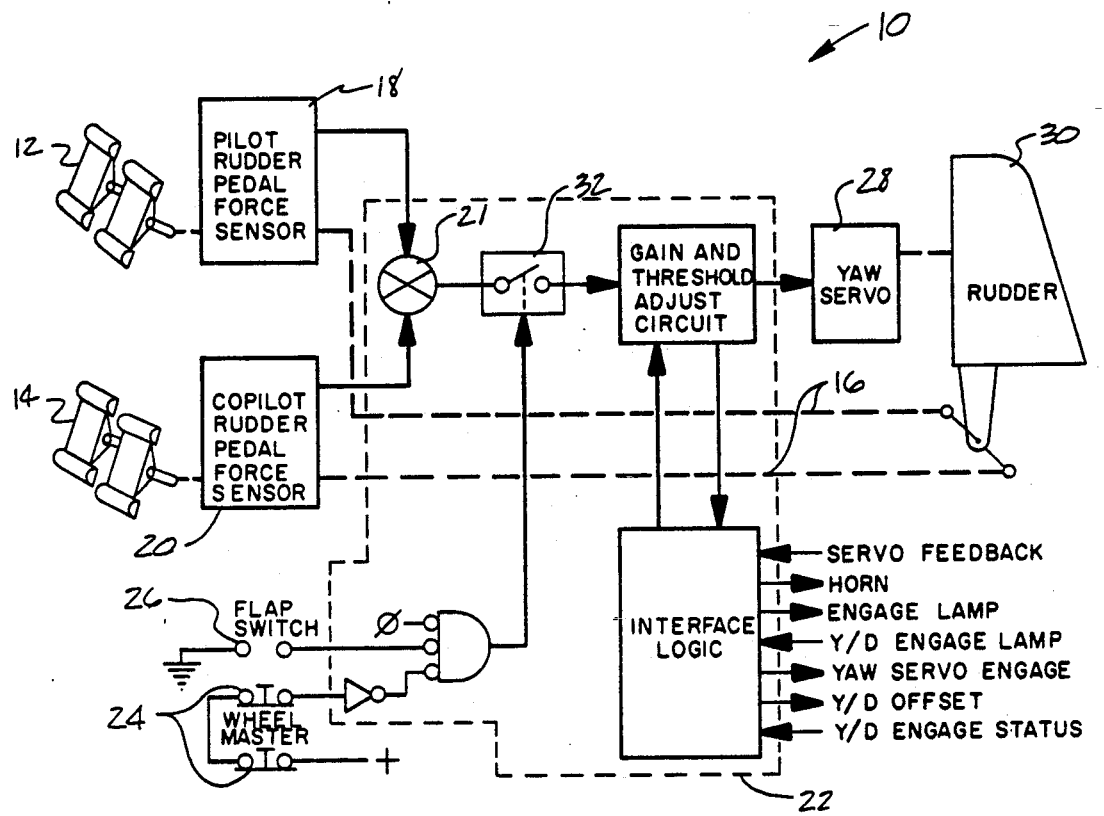
FIG. 1 is a block diagram showing the preferred embodiment of the invention.

Referring to the drawings, and more particularly to FIG. 1, the rudder boost system of the present invention is generally described by reference numeral 10. Manually controlled aircraft usually include dual controls for the pilot and copilot, including two pairs of rudder pedals 12 and 14 which are connected to the rudder 30 through a series of bell cranks, not shown, and cables 16, which are symbolically illustrated. Located in the pilot and copilot rudder pedal linkages are force measuring links or sensors 18 and 20, respectively, which are standard force measuring links commonly known in the prior art. The links receive 6.5 volts AC and output 11 millivolt per pound of force at the sensor. The output signals from the force links 18 and 20 are algebraically added at the summing juncture 21 which adds the combined forces applied from both the rudder pedals 12 and 14 and in turn passes that combined signal to the boost computer 22.

Figure 2:
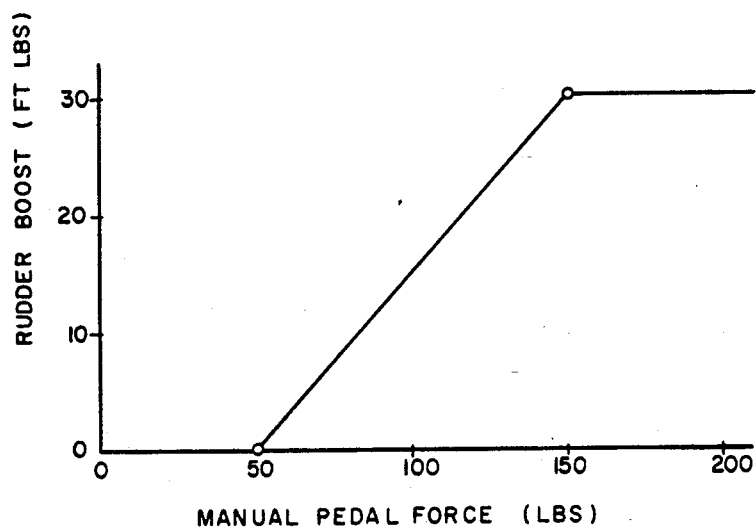

The rudder boost system 10 can be engaged and tested on the ground by applying more than 50 pounds of force to the rudder pedals and partially lowering the flaps greater than three degrees (3°) which closes flap switch 26. The boost system 10 can be disengaged when either of the control master switches 24 are pressed or pressure is released from the rudder pedals. While the computer 22 is calibrated to initiate boost at 50 pounds of force and the flap extension switch is set at three degrees (3°), these limits are adjustable for the particular aircraft. As the combined pedal force increases above 50 pounds, the rudder boost force also increases in a linear relationship, as shown in FIG. 2. The rudder boost, illustrated in the foot pounds of torque, begins to increase from zero to a maximum of 30 foot pounds of torque at the 150 pound pedal force level. If the pedal force exceeds 150 pounds, the rudder boost torque remains at its maximum of 30, also referred to as a rudder hinge moment of 30 foot pounds. As the boost computer 22 receives increasing output signals from the force measuring sensors 18 and 20, it in turn signals the yaw servo 28 to increase boost torque to rudder 30 in accordance with the graph of FIG. 2. While the rudder boost system 10 utilizes the same yaw servo 28 of the yaw dampening system, it is capable of operating independently thereof and has priority over the yaw dampening system. Simultaneous operation of the rudder boost system and the yaw dampening system is prevented by electronic interlock and the rudder boost system would take priority. The yaw servo 28 is mechanically connected to the rudder by two cables, not shown, and includes a capstan with a slipable electric clutch which allows the pilot to overpower the servo 28 when in a malfunctioning condition. A jamming situation at the yaw servo 28 is not possible because of the capstan with the slipable clutch mentioned above. The boost system will take priority over the yaw dampening system so that mixed signals will not be applied to the yaw servo.

OPERATION

With the de-modulation switch 32 of the boost system open, the system 10 is inoperative regardless of the pedal forces on the rudder cables 16 until the flaps have been lowered sufficiently to close flap switch 26, master wheel switch 24 is likewise closed and the AC reference signal is in-phase. With switch 32 closed, when the combined pedal forces on rudder pedals 12 and 14 exceed 50 pounds, the boost computer 22 will signal the yaw servo 28 to increase its output torque proportionally to the summation of the pedal forces on the force links 18 and 20 in a linear fashion, as shown on the graph in FIG. 2. A rudder pedal force at or above 50 pounds will hold the yaw dampening system dormant as long as the combined force on the rudder pedals exceeds 50 pounds. The forces applied by each pilot are added algebraically in the summing juncture 21 so that the maximum yaw servo output torque will be obtained with the application of 75 pounds being applied by each pilot, or 150 pounds is applied by one pilot. The system 10 could also be utilized on aircraft having a single pilot control set of rudder pedals.

The rudder boost computer 22 also provides the following other minor functions:
1. Servo Feedback Logic—servo effort feedback.
2. Disconnect Horn logic—provide disconnect horn when disconnect not in transition.
3. Engage Lamp Logic—control illumination of engage lamp.
4. Yaw Damper Engage Lamp Logic—a status input to the computer.
5. Yaw Damper Disconnect Logic—a status input to the rudder boost computer.
6. Offset Control Logic—cancel offset in dependent system.
7. Servo Engage Logic—engage servo.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A proportional rudder boost system for a manually controlled aircraft having pilot and copilot rudder pedals and a separate yaw dampening circuit, the combination comprising:
    a variable motive means for providing power assist to the manually operated rudder and power to the yaw dampening circuit;
    a force measuring means on both the pilot and copilot rudder pedals including a summation means which adds the maual inputs from both pilots to provide a combined output signal;
    boost computer command means responsive to said combined signal when it exceeds a minimum force level to provide an output signal to the motive means to proportionally increase from zero, the power assist force to the rudder, in proportion to the increase in manual force applied to the rudder pedals up to a maximum power assist force level the boost computer means takes priority over the yaw damper circuit.

2. A proportional rudder boost system as set forth in claim 1, wherein the minimum force levels at which the power assist force begins is in a range between 40 and 60 pounds, and the boost means, signals the motive means where by the boost force increase or decrease is proportionally the same as the manual force increase or decrease.

3. A proportional rudder boost system as set forth in claim 1, including a flap position means which signals the boost computer means to call for power assist only when the flaps are in a partially to fully extended position.

4. A proportional rudder boost system as set forth in claim 1, wherein the minimum force level at which the power assist force begins is in the range between 30 and 60 pounds.

5. A proportional rudder boost system for a manually controlled aircraft having pilot rudder pedals and a separate yaw dampening circuit, the combination comprising:
- a variable motive means for providing power assist to the manually operated rudder and to the yaw dampening circuit;
- a force measuring means on the pilot rudder pedals which provides an output signal;
- boost computer command means responsive to said signal when it exceeds a minimum force level to provide an ouput signal to the motive means to proportionally increase from zero, the power assist force to the rudder, in proportion to the increase in manual force applied to the rudder pedals up to a maximum power assist force level the boost computer means takes priority over the yaw damper circuit.

6. A proportional rudder boost system as set forth in claim 5, wherein the minimum force levels at which the power assist force begins is in a range between 40 and 60 pounds.

7. A proportional rudder boost system as set forth in claim 5 including a flap position means which signals the boost computer means to call for power assist only when the flaps are in a partially to fully extended position.

* * * * *